S. J. HALSTEAD.
Horse Hay-Rake.
No. 90,446. Patented May 25, 1869.
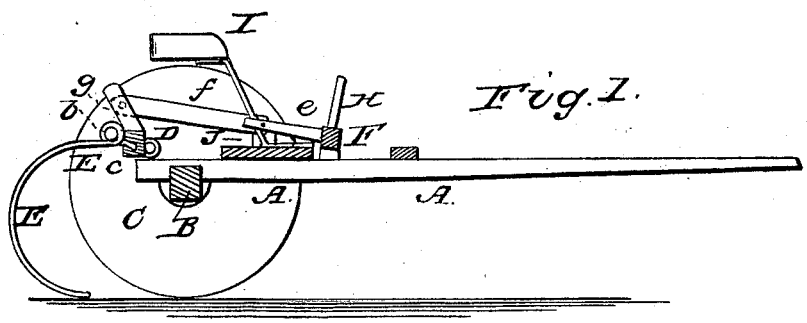
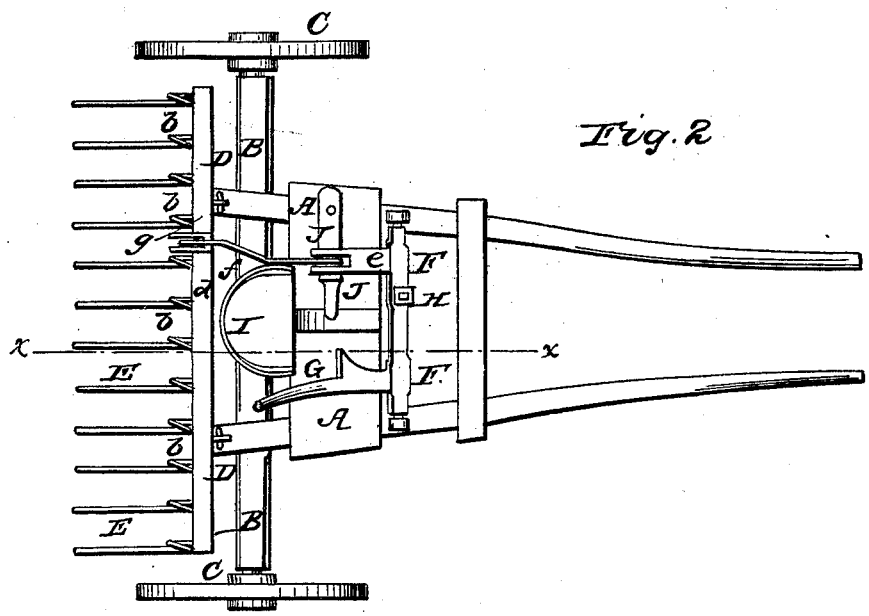
Witnesses
Jno. A. Brooks,
Geo. W. Mabee
Inventor
S. J. Halstead
per Munn & Co.
Attorneys

UNITED STATES PATENT OFFICE.

STEPHEN J. HALSTEAD, OF MARGARETTVILLE, NEW YORK.

IMPROVEMENT IN HORSE-RAKES.

Specification forming part of Letters Patent No. 90,446, dated May 25, 1869.

*To all whom it may concern:*

Be it known that I, STEPHEN J. HALSTEAD, of Margarettville, in the county of Delaware and State of New York, have invented a new and Improved Horse Hay-Rake; and I do hereby declare that the following is a full, clear, and exact description thereof, which will enable others skilled in the art to make and use the same, reference being had to the accompanying drawing, forming part of this specification, in which—

Figure 1 represents a vertical section of my improved horse hay-rake, taken on the plane of the line $x\ x$, Fig. 2. Fig. 2 is a plan or top view of the same.

Similar letters of reference indicate corresponding parts.

This invention relates to certain improvements in the manner of arranging the levers for swinging the rake-head, and to a new device for adjusting the teeth at any desired distance from the ground.

The invention consists in the application of an inclined swinging bar to the frame of the machine, in combination with the rod that connects the rake-head with a rock-shaft carrying the dumping-lever, all being so arranged that by means of the said swinging bar the rake-teeth will be held any desired distance above the ground while raking, so as either to operate superficially or thoroughly, as may be desired.

A in the drawing represents the frame of the rake, supported on the axle B, on which the wheels C C turn loose. D is the rake-head, hinged to the back of the frame, and carrying the teeth E E.

The upper end of each wire tooth is formed into a hook, $a$, as in Fig. 1, and is then bent to form a spring-coil, $b$.

The rake-head consists of two longitudinal bars, $c\ d$, of which the lower one, $c$, has vertical apertures to receive the ends of the hooks $a$. The upper bar, $d$, is securely fastened upon the bar $c$, to cover the hooks, as shown.

On the frame A are the bearings of a rock-shaft, F, from which a lever, G, for the hand, and an arm, H, for the foot, project within convenient reach of the seat I.

An arm or lug, $e$, projecting from the rock-shaft, is, by means of a rod, $f$, connected with an arm, $g$, that projects from the rake-head. The rake can thus, by means of the lever G or H, be readily swung up or down.

The downward motion is regulated by a bar, J, which is pivoted to the upper surface of the frame A, and which fits, with its inclined upper surface, under the arm $e$. When it is swung more forward it will hold the arm $e$ higher, and will thereby keep the point of the rake-teeth farther from the ground. When swung farther back it will allow the teeth to be more lowered. The height of the teeth can thus be regulated in accordance with the nature of the soil, or of the matter to be raked, by setting the bar J in the required position.

Having thus described my invention, what I claim as new, and desire to secure by Letters Patent, is—

The combination of the swinging bar J with the rock-shaft F, arm $e$, rod $f$, and rake-head, all arranged and operating so that the height of the teeth above the ground while raking can be regulated at will, substantially as herein shown and described.

STEPHEN J. HALSTEAD.

Witnesses:
W. R. SWART,
J. A. SWART.